US012671876B2

(12) United States Patent
Kiyomiya

(10) Patent No.: US 12,671,876 B2
(45) Date of Patent: Jun. 30, 2026

(54) VIDEO GENERATION DEVICE AND STORAGE MEDIUM STORING COMPUTER PROGRAM

(71) Applicant: BANDAI CO., LTD., Tokyo (JP)

(72) Inventor: Ryota Kiyomiya, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 28 days.

(21) Appl. No.: 18/811,820

(22) Filed: Aug. 22, 2024

(65) Prior Publication Data

US 2025/0071392 A1    Feb. 27, 2025

(30) Foreign Application Priority Data

Aug. 25, 2023    (JP) .................................. 2023-137373

(51) Int. Cl.
  *H04N 21/81*      (2011.01)
  *G06F 3/01*       (2006.01)
  *G06T 19/20*      (2011.01)
(52) U.S. Cl.
  CPC ........... *H04N 21/816* (2013.01); *G06F 3/013* (2013.01); *G06T 19/20* (2013.01)
(58) Field of Classification Search
  CPC ........ H04N 21/816; G06F 3/013; G06T 19/20
  See application file for complete search history.

(56) References Cited

U.S. PATENT DOCUMENTS

2015/0130838 A1    5/2015  Kasahara et al.
2018/0068488 A1*   3/2018  Hart ...................... G06T 19/006

2019/0051019 A1    2/2019  Kasahara et al.
2020/0368616 A1*  11/2020  Delamont ............ H04N 13/239
2020/0388070 A1*  12/2020  Jiang .................... H04N 13/282
2022/0254111 A1*   8/2022  Fukazawa ............. G06T 19/006
2023/0191254 A1*   6/2023  Iwao ........................ A63F 13/58

FOREIGN PATENT DOCUMENTS

JP        2008-033840 A    2/2008
JP        2015-095147 A    5/2015
JP        2019-046291 A    3/2019
JP        2020-107251 A    7/2020
JP        2023-018253 A    2/2023

OTHER PUBLICATIONS

Jul. 8, 2024, Japanese Office Action issued for related JP Application No. 2023-137373.

* cited by examiner

*Primary Examiner* — Randy A Flynn
(74) *Attorney, Agent, or Firm* — Paratus Law Group, PLLC

(57)        ABSTRACT

A video generation device including: a generator that generates a video in which a 3-dimensional model is disposed in a virtual space, the 3-dimensional model being based on 3-dimensional model data generated from a scan image of an outer appearance of an object; an output unit that outputs the video to a display device; a receiver that receives a manipulation input from a first observer of a video; and a determination unit that determines content of the manipulation input, in which the generator generates the video in accordance with a result of a determination by the determination part, and when the determination unit determines that the 3-dimensional model is disposed at a predetermined position in the virtual space, the generator includes an effect different in accordance with a determined disposition location in the video.

16 Claims, 12 Drawing Sheets

VIDEO DISPLAYING PROCESS — S506

DISPLAY MENU SCREEN — S601

RECEIVE SELECTION — S602

DISPLAY SELECTED DATA — S603

RECEIVE MANIPULATION — S604

DISPLAY VIDEO IN RESPONSE TO RECEIVED MANIPULATION — S605

RETURN

PLEASE SELECT DESTINATION

MY ROOM

BATTLE ROOM

MY ROOM

STORAGE

BATTLE ROOM

FRIEND ROOM

VIDEO GENERATION DEVICE AND STORAGE MEDIUM STORING COMPUTER PROGRAM

CROSS-REFERENCE TO RELATED APPLICATION

This application is based upon and claims the benefit of priority from Japanese Patent Application No. 2023-137373, filed on Aug. 25, 2023, the entire contents of which are incorporated herein by reference.

TECHNICAL FIELD

The present invention relates to a video generation device and a storage medium storing a computer program.

BACKGROUND ART

JP2020-107251A discloses a technique for generating a virtual space image viewed from a virtual camera in a virtual space by primitively mapping, in the virtual space, textures that are generated from a captured image group obtained by causing imaging units to image a target in a plurality of imaging directions.

In the above technique, when a target is imaged to generate a video in which a 3-dimensional model is disposed in a virtual space using 3-dimensional model data of the imaged target, it is expected to generate a video in accordance with a manipulation received from a user.

Accordingly, an object of the present invention is to enable a video to be generated in accordance with a manipulation received from a user when a target is imaged to generate a video in which a 3-dimensional model is disposed in a virtual space using 3-dimensional model data of the imaged target.

SUMMARY OF INVENTION

According to an aspect of the present invention, there is provided a video generation device including:

a generator configured to generate a video in which a 3-dimensional model is disposed in a virtual space, the 3-dimensional model being based on 3-dimensional model data generated from a scan image generated by scanning an image of an outer appearance of an object with a scanner;

an output unit configured to output the video generated by the generator to a display device;

a receiver configured to receive a manipulation input from a first observer of a video displayed on the display device; and a determination unit configured to determine content of the manipulation input received by the receiver, in which the generator is configured to generate the video in accordance with a result of a determination by the determination part, and in which, when the determination unit determines that the 3-dimensional model is disposed at a predetermined position in the virtual space, the generator includes an effect different in accordance with a determined disposition location in the video.

BRIEF DESCRIPTION OF DRAWINGS

FIG. 1 is a diagram illustrating an example of a configuration of an image processing system according to an embodiment.

DESCRIPTION OF EMBODIMENTS

Figure 2A:
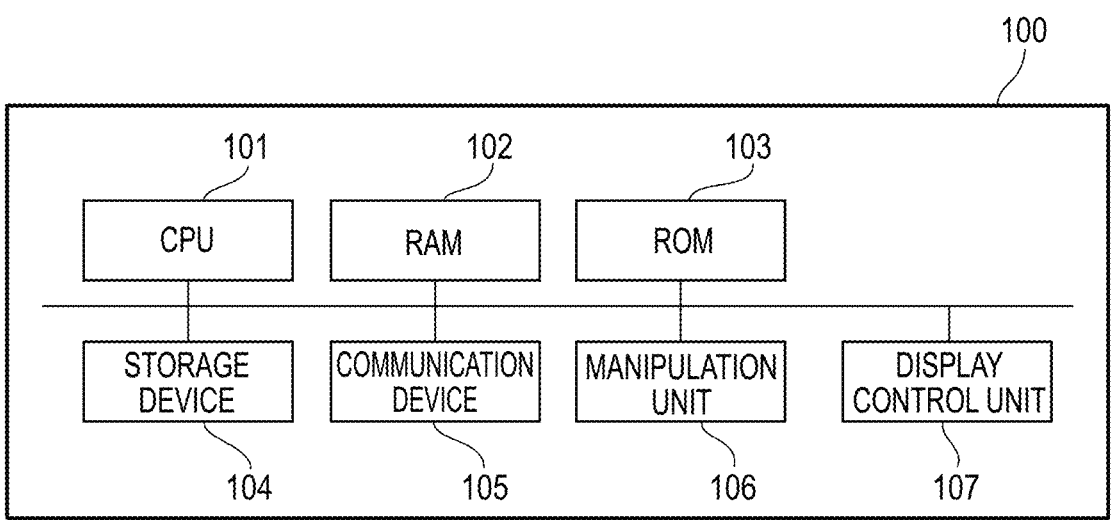
FIGS. 2A and 2B are diagrams illustrating examples of a hardware configuration of an information processing device and an example of a hardware configuration of a headset according to the embodiment.

Hereinafter, an embodiment will be described in detail with reference to the appended drawings. The following embodiment does not limit the present invention according to the claims and all combinations of features described in the embodiment are not requisite for the present invention. Of a plurality of features described in the embodiment, two or more features may be arbitrarily combined. The same reference numerals denote the same or similar configurations and repeated description thereof will be omitted. In each drawing, upper, lower, left, right, front, and back directions relative to the sheet are used as upper, lower, left, right, front, and back directions of components (parts) in the embodiment in description of the text.

Figure 1:
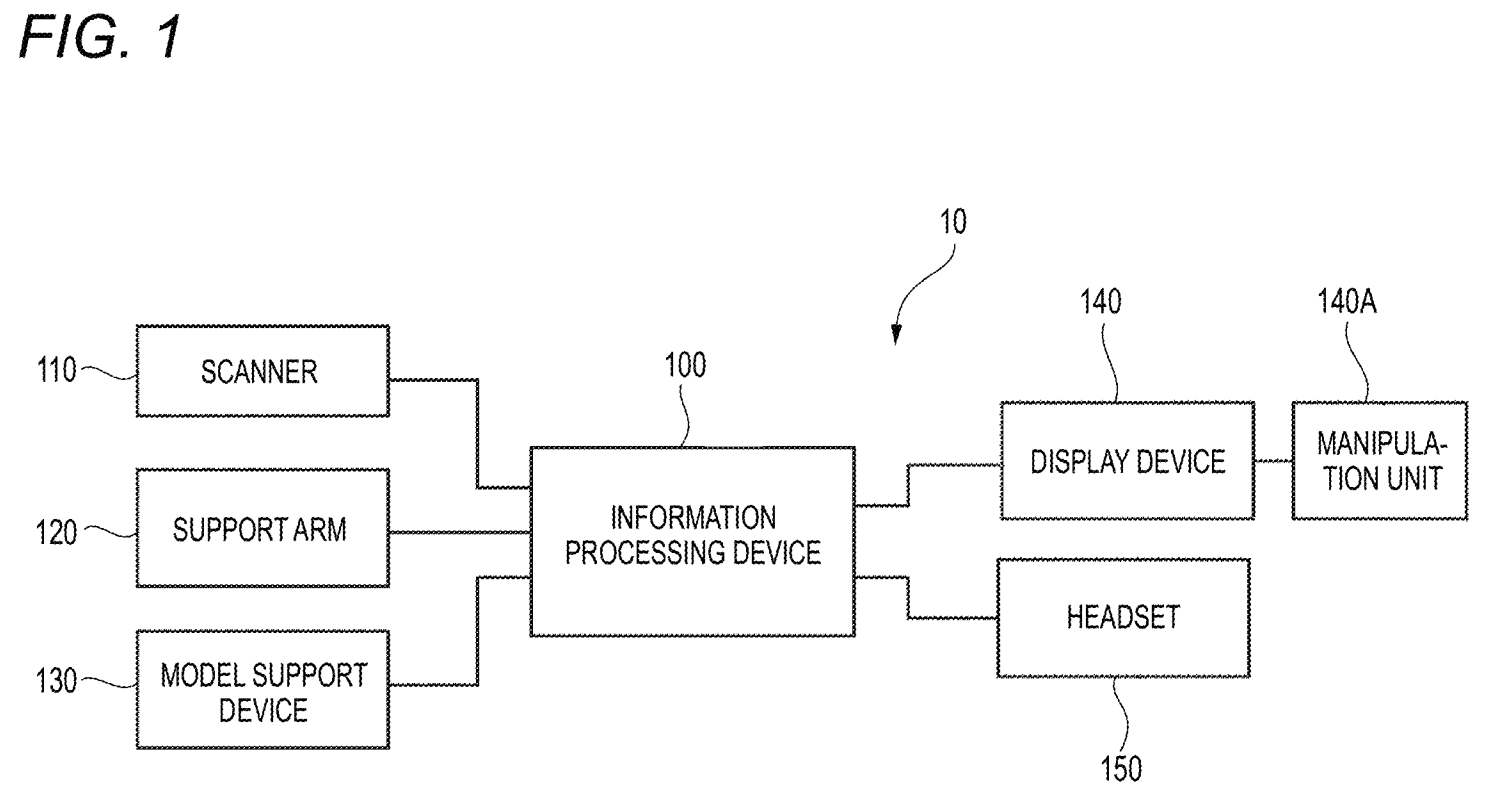

First, a configuration of an image processing system according to an embodiment will be described. FIG. 1 is a diagram illustrating an example of a configuration of an image processing system 10 according to the embodiment. In the image processing system 10, a scanner 110, a support arm 120, a model support device 130, a display device 140, a headset 150, and the like are connected to an information processing device 100. The configuration of the system is not limited to the configuration illustrated in FIG. 1, and the information processing device 100 may be further connected to an external server, a cloud server, or the like via a network. In the external server or the like, at least some of processes according to the embodiment to be described below can be performed.

The information processing device 100 controls an operation of at least any one of the scanner 110, the support arm 120, and the model support device 130 and images an imaging target item at any angle to generate a plurality of images and generate 3-dimensional model data (present data) from the plurality of images. When the imaging target item can be separated into a plurality of constituent items, 3-dimensional model data of the target item may be generated by imaging each constituent item to generate 3-dimensional model data and integrating the 3-dimensional model data.

The information processing device 100 can also function as a video generation device that generates a video that is displayed in a virtual space by using the generated 3-dimensional model data as virtual space data. In the embodiment, an imaging target object is any of items such as an assembly plastic model, an action figure (a figure that has movable joints), a toy, and a doll, which are collectively referred to as "models" below.

Next, the scanner 110 is a 3-dimensional scanner device that images (scans) a 3-dimensional shape of an imaging target item model under the control of the information processing device 100 and outputs the 3-dimensional shape and color information of the imaging target. In the embodiment, scan signals output from the scanner 110 are collectively referred to as a "scan image". As the scanner 110, for example, Space Spider manufactured by Artec Co., Ltd. can be used. In the embodiment, for example, by acquiring about 500 frames to 800 frames of the scan images, it is possible to acquire 3D scan data of an entire toy. As the scanner 110, for example, a smartphone with a camera in which an application for capturing a 3-dimensional shape is installed may be used.

The support arm 120 is a position and pose control device that moves the scanner 110 to a predetermined imaging position and pose under the control of the information processing device 100. The support arm 120 may be configured to change an imaging position and pose manually and to maintain the changed position and pose fixedly or may be configured to be able to be controlled by the information processing device 100. When the support arm 120 can be controlled by the information processing device 100, for example, xArm7 manufactured by UFACTORY Co. Ltd., can be used. xARM7 includes seven joints and can move similarly to a human arm. Instead of the support arm 120, the scanner 110 can be positioned manually. For an imaging position and pose that cannot be covered by the support arm 120, the scanner 110 may be manually operated to perform scanning.

The model support device 130 is a support stand that supports a model fixed at a pose. The model support device 130 may be configured to be able to rotate when the model is installed on the support stand or at the distal end of a support rod. In the embodiment, after the scanner 110 is positioned at any imaging position and imaging angle by the support arm 120, the model support device 130 is rotated once to perform imaging. By performing the imaging at a plurality of imaging positions and imaging angles, it is possible to obtain an image of an entire model. Here, by synchronously driving the model support device 130 and the support arm 120, it is possible to perform an imaging process more simply and with high accuracy. Instead of the model support device 130, the scanner 110 may be moved manually around the model to perform scanning at any imaging position and imaging angle.

The display device 140 is a display device such as a liquid crystal display (LCD) and can display a processing result in the information processing device 100. Specifically, images acquired with the scanner 110 can be displayed, the present data of the 3-dimensional model data generated from the captured images can be displayed, or a video restored using the present data (VR video) can be displayed. The display device 140 can include a manipulation unit 140A that receives a manipulation from a user who is an observer of a display video, and thus the user can manipulate the manipulation unit 140A to perform a manipulation input in accordance with content of a video displayed on the display device 140.

The headset 150 includes a head-mounted display 150A and a controller 150B to be described below. In particular, the VR headset may be configured to provide a moving image corresponding to a pose or an inclination of the user who is an observer. A predetermined application can be installed in the headset 150, and application data that is executed in the application can be downloaded from the information processing device 100 to be executed. In the embodiment, like the information processing device 100, the headset 150 can also function as a video generation device that generates a video displayed on a virtual space using the 3-dimensional model data as virtual space data and provides the generated video as a VR video. The application data includes display data for displaying the VR video.

Next, a hardware configuration of the information processing device 100 according to the embodiment will be described. FIG. 2A is a diagram illustrating an example of a hardware configuration of the information processing device 100. A CPU 101 is a device that controls the entire information processing device 100 and computes, processes, and manages data. For example, timings at which images are captured and the number of captured images in the scanner 110 can be controlled and arm joints of the support arm 120 can be controlled to dispose the scanner 110 at any imaging position and imaging angle. After the imaging position and the imaging angle of the scanner 110 are determined, the model support device 130 can be rotated and an imaging operation can be performed by the scanner 110. The CPU 101 can also function as an image processing unit that processes an image output from the scanner 110. The CPU 101 can perform a process of generating a video in which the 3-dimensional model is displayed in the virtual space by using the 3-dimensional model data generated based on the scan signal obtained by the scanner 110 as the virtual data. Details of the displaying process will be described in detail below.

A RAM 102 is a volatile memory and is used as a main memory of the CPU 101 or a temporary storage area such as a work area. A ROM 130 is a nonvolatile memory and stores image data or other data, various programs causing the CPU 101 to operate, and the like in predetermined areas. The CPU 101 controls each unit of the information processing device 100 using the RAM 120 as a work memory in accordance with the program stored in, for example, the ROM 103. The program causing the CPU 101 to operate may be stored not in the ROM 103 but in the storage device 104.

The storage device 104 is configured with, for example, a magnetic disk such as a flash memory or an HDD. The storage device 104 stores an application program, an OS, a control program, an associated program, a game program, and the like. The storage device 104 can read and write data under the control of the CPU 101. The storage device 104 may be used instead of the RAM 102 or the ROM 103.

A communication device 105 is a communication interface that communicates with the scanner 110, the support arm 120, the model support device 130, the display device 140, and the headset 150 under the control of the CPU 101. The communication device 105 may be further configured to be able to communicate with an external server or the like. The communication device 105 can include a wireless communication module. The module can include a known circuit mechanism that includes an antenna system, an RF transceiver, one or more amplifiers, a tuner, one or more oscillators, a digital signal processor, a CODEC chip set, a subscriber identification module card, and a memory. Here, communication performed by the information processing device 100 with the scanner 110, the support arm 120, the model support device 130, the display device 140, and the headset 150 may be wireless communication.

The communication device 105 can also include a wired communication module for wired connection. The wired communication module enables communication with another device including the display device 140 via one or more external ports. The wired communication module can include various software components that process data. The external ports are coupled with other devices directly or indirectly via a network via an Ethernet, a USB, an IEEE1394, and the like. The wired communication module can also be configured as an alternative of a hardware device by software that implements the same function as each of the above devices.

A manipulation unit 106 is configured with, for example, a button, a keyboard, a touch panel, a controller, or the like and receives a manipulation input from a user. The manipulation unit 106 may be common to the manipulation unit 140A or may be independent of the manipulation unit 140A. For example, when the manipulation unit 140A is assumed to be a manipulation unit configured as a keyboard and a mouse, and the like, the manipulation unit 140A can be common to the manipulation unit 106. On the other hand, when the manipulation unit 140A is assumed to be a manipulation unit configured as a touch panel, a controller, or the like, the manipulation unit 140A can be a manipulation unit independent of the manipulation unit 106.

A display control unit 107 functions as a control unit that displays information on the display device 140 connected to the information processing device 100 and controls an operation of the display device 140. Some functions of the manipulation unit 106 may be included in the display device 140. For example, the display device 140 may be configured as a device that includes a touch panel like a tablet terminal.

Figure 2B:
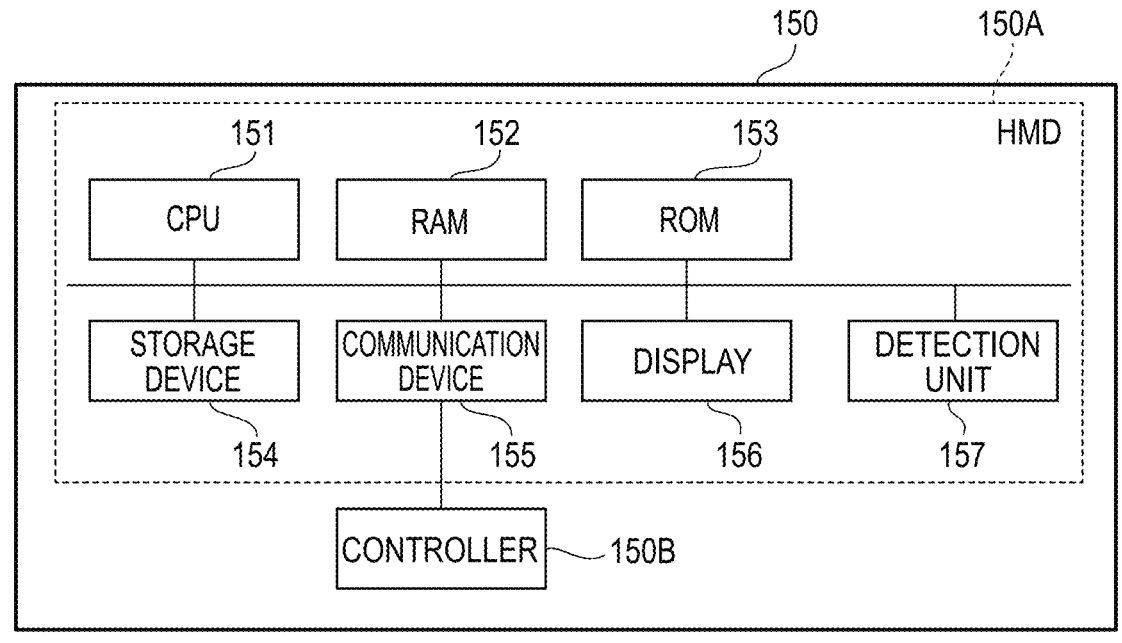

Next, a hardware configuration of the headset 150 according to the embodiment will be described. FIG. 2B illustrates an example of a hardware configuration of the headset 150. The headset 150 includes a head-mounted display (TIMID) 150A and a controller 150B. The HMD 150A enables a user to feel a virtual reality (VR) experience by providing right-eye and left-eye videos to the right and left eyes of the user, respectively, and allowing a stereoscopic effect by a parallax. The controller 150B is provided in a casing independent of the HMD 150A. The controller 150B is configured as a pair of two controllers held and manipulated by right and left hands of the user, but may be configured as a single controller.

A CPU 151 is a device that controls the entire headset 150 and computes, processes, and manages data. For example, application data downloaded from the information processing device 100 can be executed and a VR video can be displayed on a display 156. Based on a manipulation received via a controller 156 or information detected by a detection unit 158, the displayed VR video can be switched, a viewpoint in a VR space can be switched, or a position in the VR space can be changed.

A RAM 152 is a volatile memory and is used as a main memory of the CPU 151 or a temporary storage area such as a work area. A ROM 153 is a nonvolatile memory and stores image data or other data, various programs causing the CPU 151 to operate, and the like in predetermined areas. The CPU 151 controls each unit of the headset 150 using the RAM 152 as a work memory in accordance with the program stored in, for example, the ROM 153. The program causing the CPU 151 to operate may be stored not in the ROM 153 but in the storage device 154.

The storage device 154 is configured with, for example, a magnetic disk such as a flash memory or an HDD. The storage device 154 stores an application program, an OS, a control program, an associated program, a game program, application data or display data downloaded from the information processing device 100, and the like. The storage device 154 can read and write data under the control of the CPU 151. The storage device 154 may be used instead of the RAM 152 or the ROM 153.

A communication device 155 is a communication interface that communicates with the information processing device 100 or the controller 150B under the control of the CPU 151. The communication device 155 includes a wireless communication module that enables wireless communication that is based on Bluetooth or WiFi (IEEE802.11). The headset 150 is connected to the information processing device 100 through wireless communication so that the display data of the VR video can be downloaded. Communication with the controller 150B is performed to receive information regarding a manipulation instruction of the user on the controller 150B.

A display 156 is configured such that right-eye and left-eye videos generated by the CPU 151 are provided to the right and left eyes of the user, respectively. A detection unit 157 is a mechanism that detects visual line directions of the right and left eyes of the user and detect an inclination of the head-mounted display. The detection unit 157 includes, for example, a sensor that detects a visual line direction or a gaze direction of the user wearing the HMD 150A. The detection unit 157 includes a gyroscope, magnetometer, an accelerometer, a global positioning system (GPS), and a compass and can specify a position, a pose, an inclination, and the like of the HMD 150A in accordance with such detection information. The detection unit 157 detects information for determining a gaze direction or an action of the user in the HMD 150A and transmits the information to the CPU 151. The CPU 151 determines the gaze direction or the action based don the received detection information and adjusts a video presented on the display 156 of the HMD 150A so that the video matches the determined gaze direction or action.

The controller 150B includes, for example, a plurality of buttons and a cross key and receives a manipulation input such as a selection manipulation or a direction instructing manipulation from the user. The controller 150B is connected to the HMD 150A via the communication device 155 through wireless communication.

Figure 3:
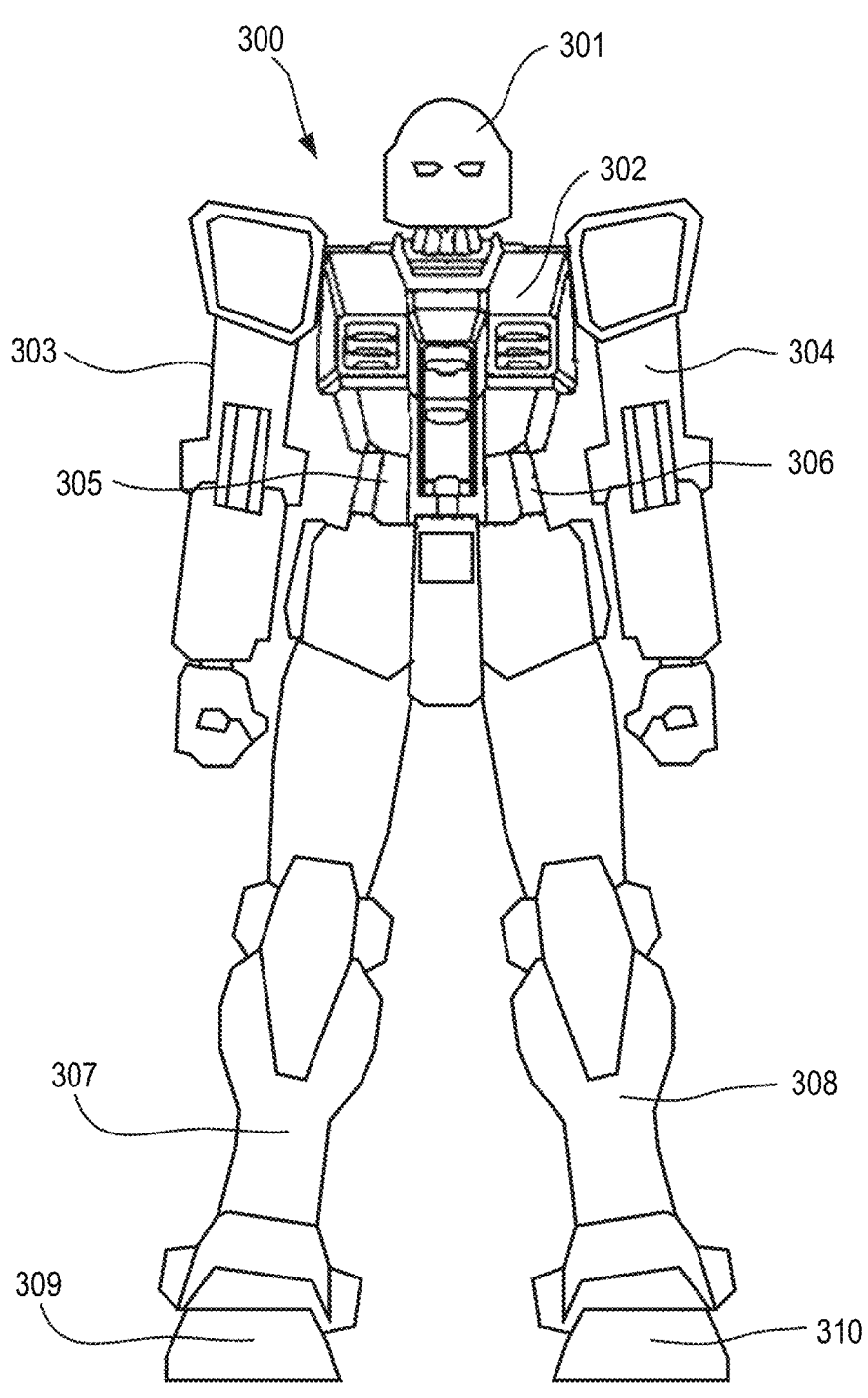
FIG. 3 is a diagram illustrating an example of an outer appearance of a humanoid model according to the embodiment.

Next, an example of a model that is an imaging target object according to the embodiment will be described with reference to FIG. 3. A model 300 is a model that has a humanoid outer appearance (a robot or a person). The model can be assembled and painted as, for example, a plastic model. Alternatively, the model may be a completed model such as a figure that has movable joints (action figure). The model of FIG. 3 is merely exemplary for description, and the shape of the model is not limited to the humanoid outer appearance and may be any shape of a model such as a general vehicle, a race vehicle, a military vehicle, an aircraft, a ship, an animal, a virtual creature. An imaging target item is, of course, not limited to a model as long as a 3-dimensional shape of the item can be imaged by the scanner 110.

The model 300 includes components such as a head part 301, a chest part 302, a right arm part 303, a left arm part 304, a right torso part 305, a left torso part 306, a right leg part 307, a left leg part 308, a right foot part 309, a left foot part 310, which are assembled together. At least some of the parts 301 to 310 are supported to be rotatable (or swingable) relative to adjacent parts. For example, the head part 301 is supported to be rotatable relative to the chest part 302, and the right arm part 303 and the left arm part 304 are supported to be rotatable relative to the chest part 302. Since the parts of the model 300 have such a joint structure, the model 300 can take any pose.

Figure 4:
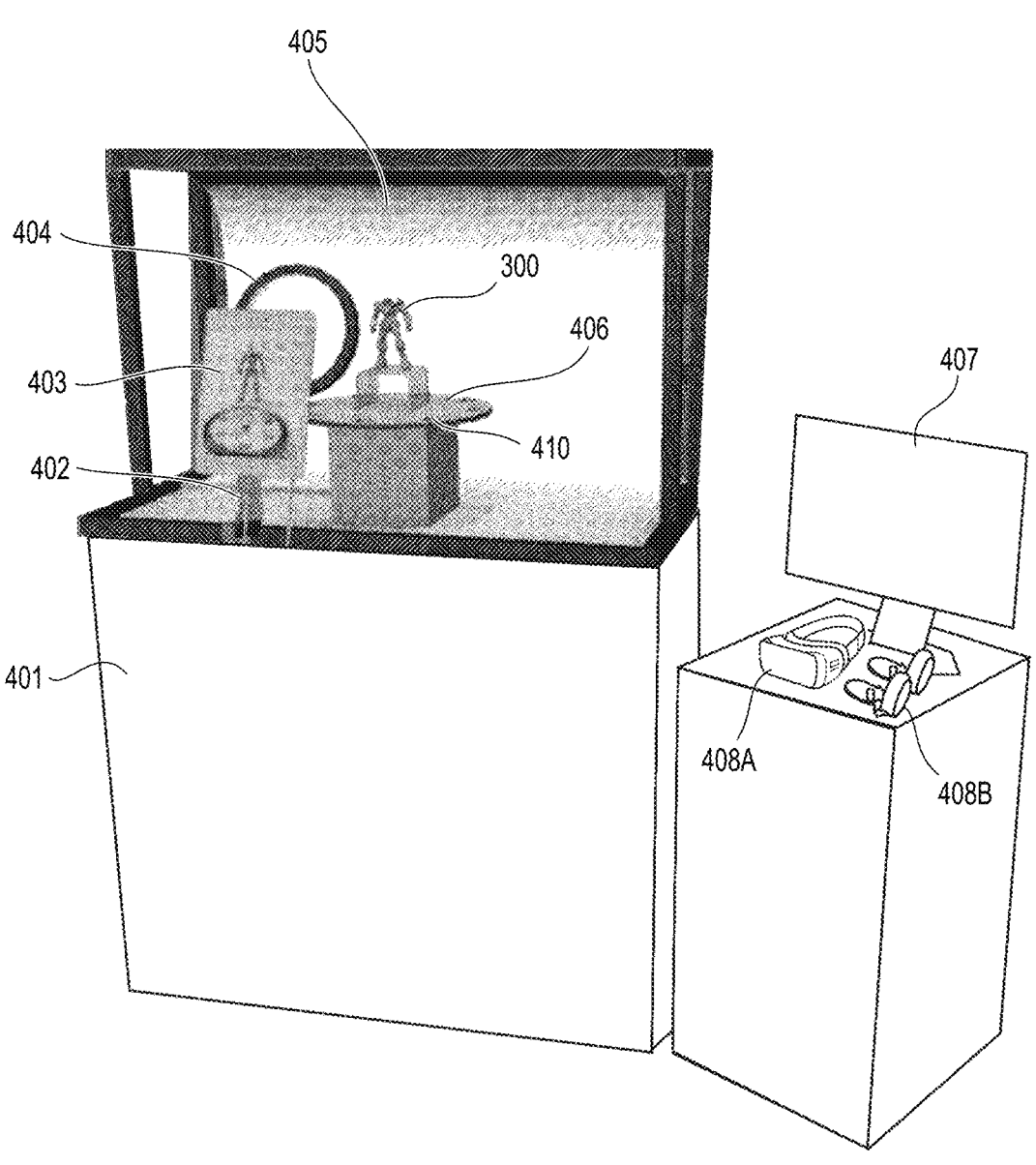
FIG. 4 is a diagram illustrating an example of implementation of the image processing system according to the embodiment.

Next, an implementation example of the image processing system 10 according to the embodiment will be described with reference to FIG. 4. FIG. 4 is a diagram illustrating an implementation example in which the present data generated by imaging the model can be generated.

In FIG. 4, a driving system that drives the information processing device 100 and the support arm 402 and a driving system that drives a turntable 406 are included in a case 401. An imaging direction and position of the support arm 402 can be adjusted manually. The surface of the case 401 has a flat structure to which an advertising poster can be attached.

The support arm 402 corresponds to the support arm 120 and can support a terminal 403 functioning as the scanner 110 manually or under the control of the information processing device 100 to fix the position of the terminal 403. The support arm 402 can also operate to control an inclination of the terminal 403.

The terminal 403 is a touch panel type terminal that can be used as the scanner 110 and contains a camera. For example, a smartphone, a tablet terminal, a digital camera, or the like can be used. Instead of such a terminal, Space Spider manufactured by Artec Co., Ltd. can also be used. FIG. 4 is just a diagram illustrating an example of a system configuration. The configuration can be realized in accordance with a type of device used as the scanner 110. The terminal 403 can capture an image of the model 300 and can transmit the image to the information processing device 100. A ring light 404 is an illumination device used when the model 300 is imaged by the terminal 403, and evenly light the model 300 so that the shadow is minimized. As an additional light source, a top light or supplementary lights on the right, left, and lower sides may be installed in addition to the ring light 404. Instead of the terminal 403, the above-described 3-dimensional scanner device may also be used.

A background sheet 405 is an imaging background sheet. For example, a white sheet can be used. The model 300 is mounted on the turntable 406 that can be rotated with the model thereon. A plurality of predetermined markers 410 may be disposed on the turntable 406. The markers 410 can be used to adjust a direction or a position of an imaged model.

In FIG. 4, the model is disposed on a semi-transparent (transparent) table. Additionally, for example, a support mechanism called "Action Base" (registered trademark) may be used. In Action Base, a support pillar configured to be bent into an "L" shape is installed on a pedestal and a model can be mounted at the distal end of the support pillar.

The above-described markers 410 may be disposed at the distal end of the support pillar. An instruction method for the model can be changed in accordance with a pose. For example, in the case of an upright pose, the model can be disposed on the transparent table so that imaging can be performed. On the other hand, when the underside of feet is required to be imaged like a flying pose, Action Base may be used. Action Base may also be used to image an upright pose.

A display device 407 is a device corresponding to the display device 140 and may have a touch panel function. The user can perform a predetermined selection operation using the touch panel function. Instead of the touch panel, a manipulation can also be received by a controller or a mouse (not illustrated) that can function as the manipulation unit 140A. A VR headset 408 includes an HMD 408A and a controller 408B respectively corresponding to the HMD 150A and the controller 150B. The user can wear the HMD 408A on his or her head and hold and manipulate the controller 408B with right and left hands to perform a manipulation while viewing VR videos.

Figure 5:
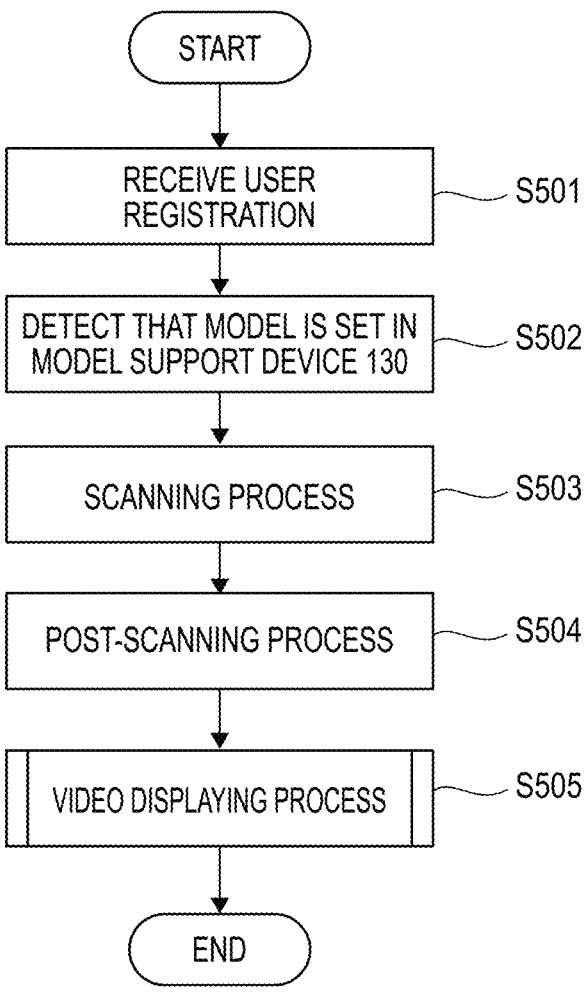
FIG. 5 is a flowchart illustrating an example of a process in the image processing system according to the embodiment.

Next, an example of a process performed by the image processing system 10 according to the embodiment will be described with reference to FIG. 5. At least a part of the process corresponding to the flowchart is realized by causing the CPU 101 of the information processing device 100 to execute a program stored in the ROM 103 or the storage device 104 or causing the CPU 151 of the headset 150 to execute a program stored in the ROM 153 or the storage device 154.

In S501, the CPU 101 first receives user registration. An input of a name or a contact address of a user is received. A user identifier for uniquely identifying an individual user is given to each user. The CPU 101 stores input user information in the storage device 104 in association with a time at which the input is received or the user identifier.

When the user registration is completed, the user sets the own model in the model support device 130. Based on a scan image by the scanner 110, the CPU 101 can determine whether the model is set in the model support device 130. Alternatively, a switch that is turned on when the model is set in the model support device 130 may be disposed so that the CPU 101 detects a signal from the switch to perform determination. Alternatively, a button that receives a manipulation when the setting of the model is completed is displayed on the display device 140 and the CPU 101 can detect whether a manipulation is received for the button manipulation. In S502, the CPU 101 detects that the model is set in the model support device 130 in accordance with any of the above-described methods. In response to the detection, the process proceeds to S503.

In S503, the scanner 110 performs a scanning process (imaging process) to generate a scan image. Specifically, the CPU 101 controls the support arm 120 such that the scanner 110 is moved to one of registered imaging positions and the scanner 110 performs scanning while the model support device 130 is rotated at the imaging position. The captured scan image is transmitted to the information processing device 100, and the CPU 101 stores the scan image in a table of the storage device 104 in association with the user identifier or the like.

Subsequently, in S504, the CPU 101 performs a post-scanning process on the scan image acquired through the scanning process, generates 3-dimensional model data, and generates video display application data (display data). In the application data, a video can be reproduced when a specific application is executed in the information processing device 100. When the specific application is executed in the head-mounted display 150A, a VR video can be reproduced. The generated 3-dimensional model data and display data are stored in the storage device 140 in association with user information.

Subsequently, in S505, a video displaying process is performed. When the video displaying process is performed in the information processing device 100, the CPU 101 executes a specific application corresponding to the display data and displays a video on the display device 140 via the display control unit 107. In S505, the CPU 101 may control the communication device 105 and transmit the display data to the HMD 150A and the CPU 151 of the HMD 150A may execute the received display data in a corresponding application and perform a process of displaying the VR video, so that the video displaying process is performed.

Figure 6:
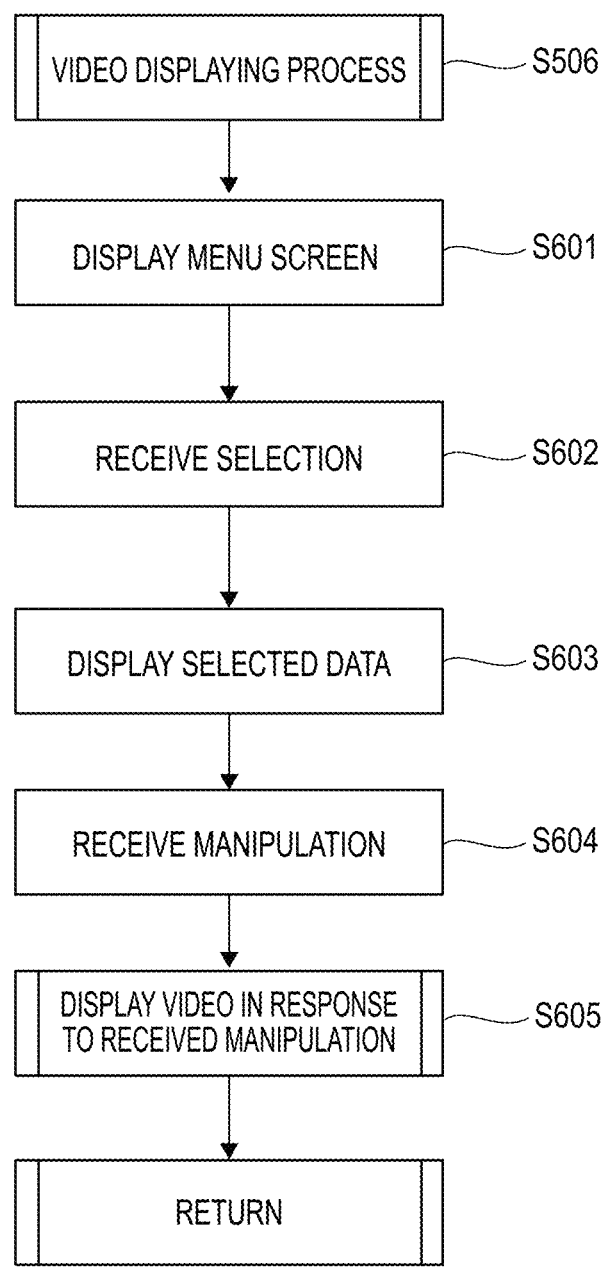
FIG. 6 is a flowchart illustrating an example of a video display process according to the embodiment.

Next, a display data displaying process corresponding to S506 will be described with reference to FIG. 6. The process of FIG. 6 is performed using the display data by the CPU 101 of the information processing device 100, or may be performed by the CPU 151 of the HMD 150A.

A VR video display application corresponding to a VR video development platform used to generate VR data is installed in the information processing device 100, and the CPU 101 can display a video on the display device 140 using the display data by executing this application. The VR video display application is also installed in the HMD 150A, and the CPU 151 can display a VR video on the display 156 using the display data by executing this application. Hereinafter, a process in the information processing device 100 will be mainly described. It is assumed that a similar process is performed in the HMD 150A unless otherwise mentioned. Accordingly, it is assumed that a process performed by the CPU 101 can be read as a process performed by the CPU 151.

First, in S601, the CPU 101 displays a menu screen on the display device 140 via the display control unit 107. In the menu screen, the user can perform a selection input via the manipulation unit 140A. Here, a plurality of options are displayed in the menu screen. An example of the menu screen is illustrated in FIG. 7A.

Figure 7A:
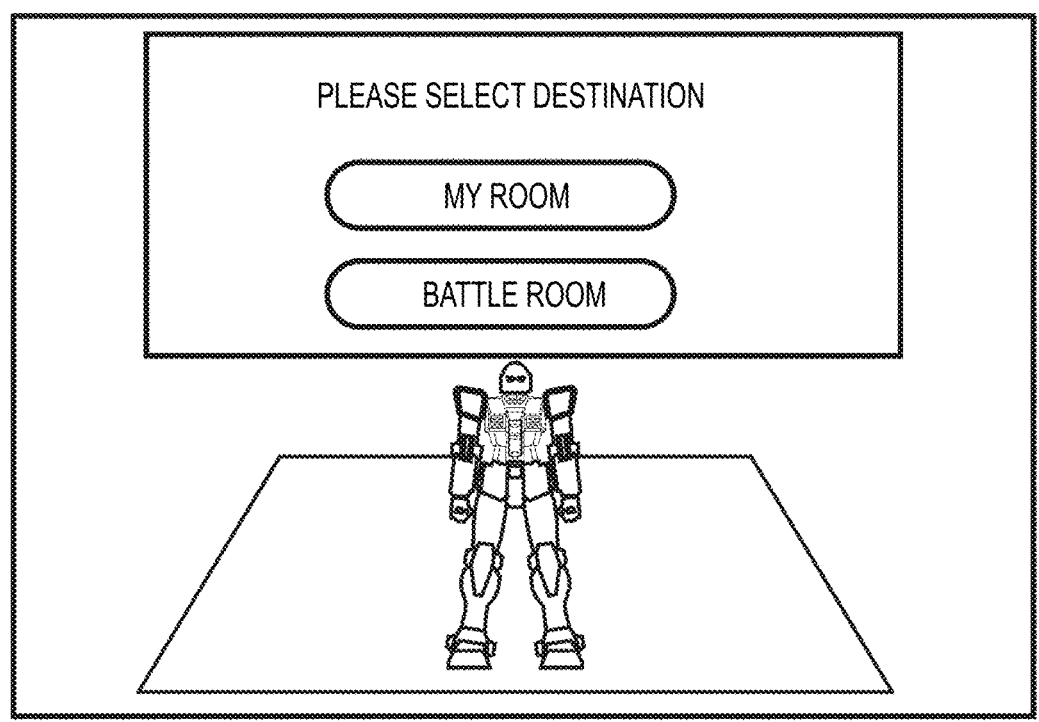
FIGS. 7A and 7B are diagrams illustrating an example of a menu screen according to the embodiment and an example of a node configuration of a virtual space according to the embodiment.

FIG. 7A is a diagram illustrating an example of the menu screen and illustrates two options of a destination of the user. One option is "My Room" that is a space provided individually to the user and where data or the like of a model scanned and taken by the user can be stored. The other option is Battle Room where a battle game can be executed using 3-dimensional model data of the model scanned and taken by the user. In the battle game, a battle between another user and a CPU can be conducted. Any game other than a battle game can also be executed.

In the screen of FIG. 7A, the user manipulates the manipulation unit 140A to move a cursor displayed on the screen to "My Room" or "Battle Room" and perform a selection manipulation (for example, a click manipulation or a button manipulation), so that a selection input can be performed. When the HMD 150A is used, the user can move the controller 150B to a position at which "My Room" or "Battle Room" overlaps and performs a button manipulation of the controller 150B, so that a selection input can be performed. A correspondent relationship between the manipulation unit 140A and the controller 150B is similar in the following description.

Figure 7B:
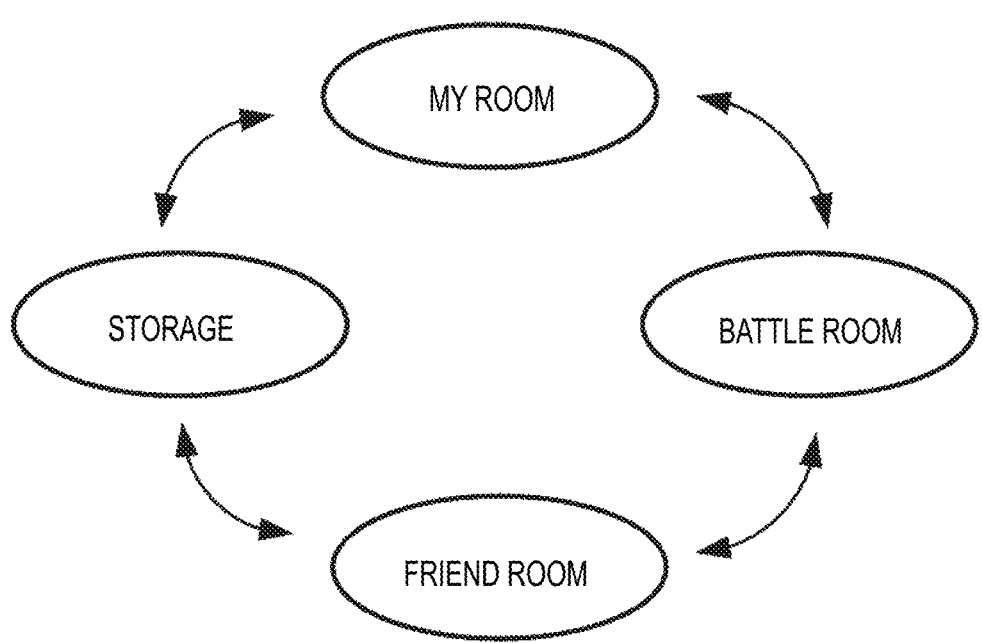

In a virtual space corresponding to the embodiment, as illustrated in FIG. 7B, there are broadly four nodes, and comings and goings are possible. In the embodiment, as the nodes, there are My Room (first space), Storage (second space), Friend Room (third space), and Battle Room (fourth space). My Room is connected to Storage, and thus movement from My Room to Storage is possible. Movement to Friend Room via storage is possible. Movement from My Room to Battle Room is possible, movement to Friend Room and movement from Friend Room to Battle Room are also possible. Nodes forming a virtual space are not limited to the nodes illustrated in FIG. 7B, but more nodes may be formed to come and go via any route.

Referring back to FIG. 6, subsequently, when a selection manipulation via the manipulation unit 140A is received from the user in S602, the CPU 101 display a video corresponding to one destination indicating the selected My Room or Battle Room on the display device 140 in S603. Subsequently, in S604, the CPU 101 acquires manipulation information on the manipulation unit 140A by the user. Subsequently, in S605, the CPU 101 performs video display in accordance with the manipulation information acquired in S604. The process in S605 includes display of My Room or Battle Room, display in accordance with a user manipulation received in the room, movement display in the room, execution of a battle game, and display of Storage.

Figure 8:
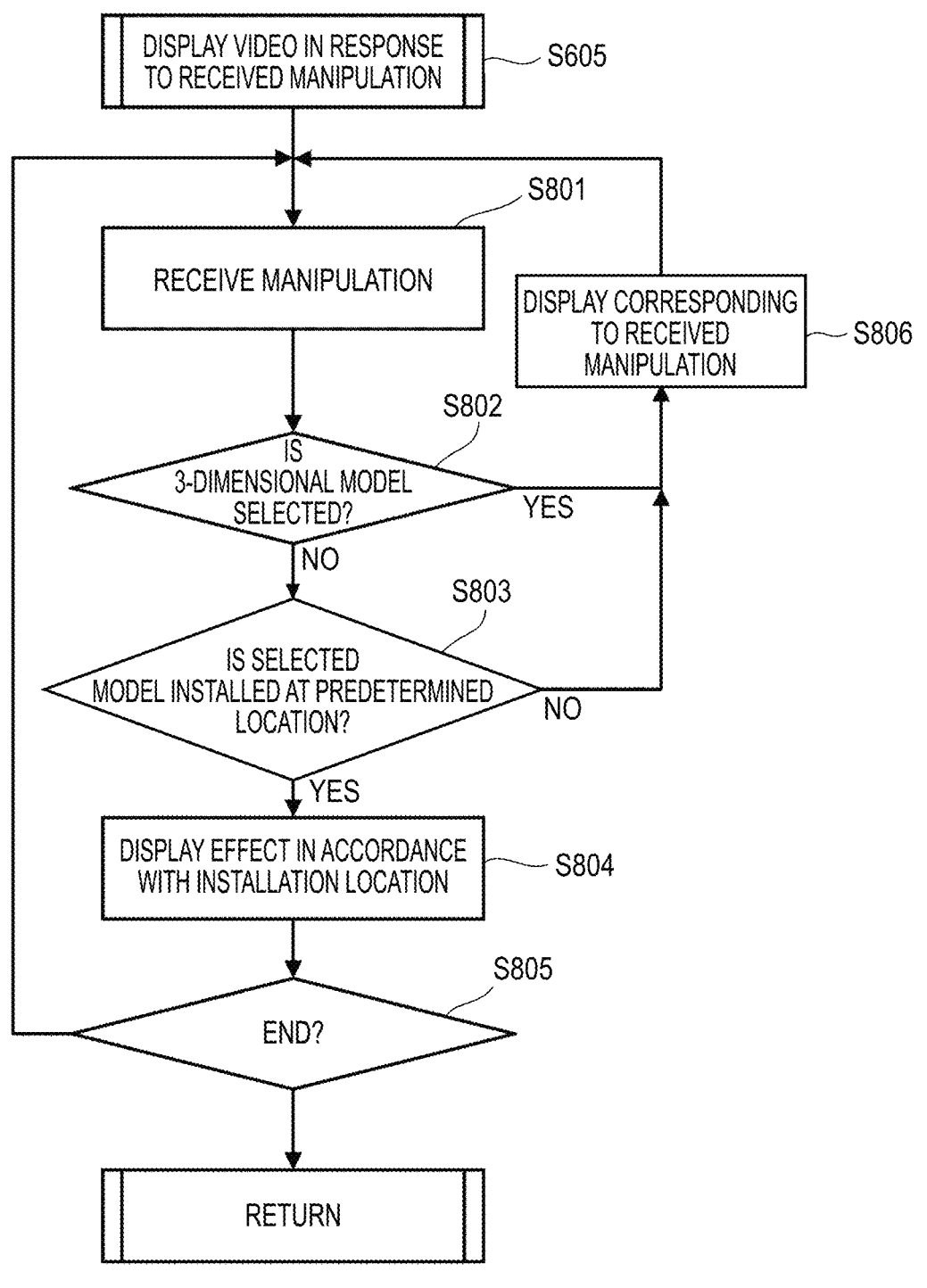
FIG. 8 is a flowchart illustrating an example of a video display process in accordance with a received manipulation according to the embodiment.

More specifically, details of the process in S605 will be described with reference to FIG. 8 to 10D. FIG. 8 is a flowchart illustrating a detailed example of the process in S605 of FIG. 6. FIGS. 9A to 9D are diagrams illustrating an example of display when "My Room" is selected in S602. FIGS. 10A to 10D are diagrams illustrating examples of display when "Battle Room" is selected in S602.

In S801 of the flowchart of FIG. 8, the CPU 101 receives a manipulation from the user via the manipulation unit 140A. This manipulation includes a movement manipulation for changing a viewpoint position of the user (including an instruction manipulation for a traveling direction or a manipulation on a cross key of a controller), a manipulation for selecting a display object, a manipulation for moving the selected display object, and a manipulation for cancelling a selected state of a selected object. The manipulation reception of S801 also includes acquisition of detection information in the detection unit 157 of the HMD 150A by the CPU 151.

Figure 9A:
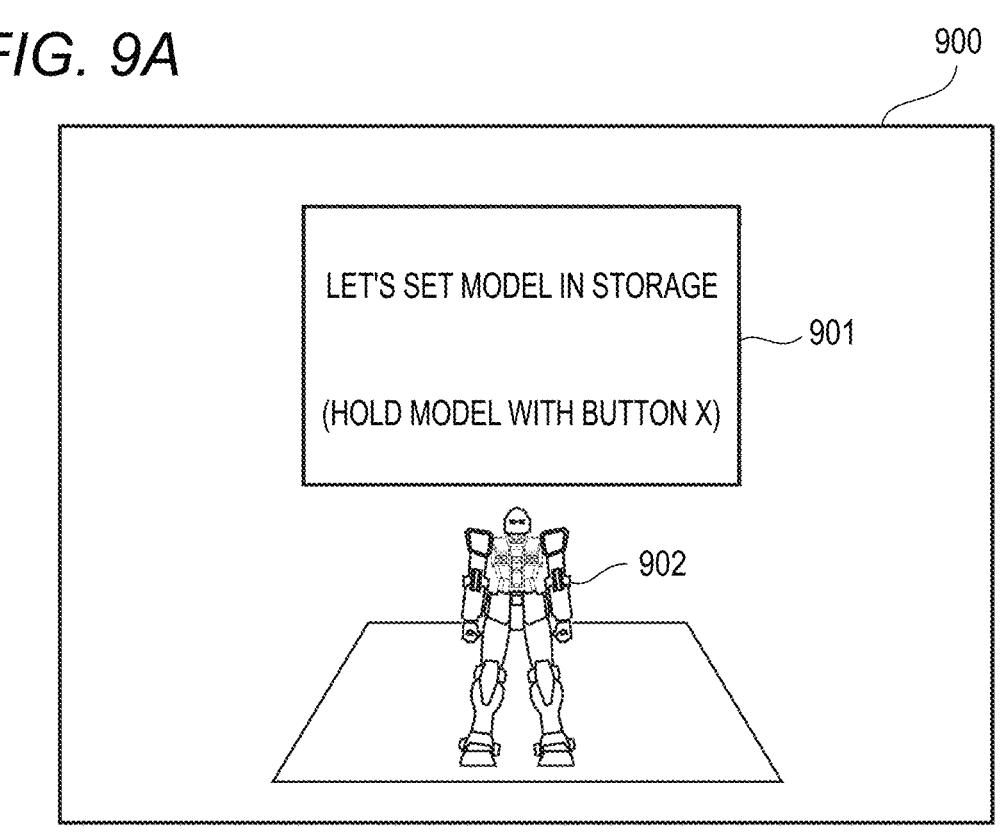
FIG. 9A is a diagram illustrating an example of a screen display in my room according to the embodiment.

For example, in an example of screen display in My Room illustrated in FIG. 9A, display indicating "Let's set model in Storage" is displayed in a region 901 of a display screen 900. A 3-dimensional model 902 of a selection candidate is displayed in a lower portion of the display screen 900. The 3-dimensional model 902 corresponds to a model taken through the scanning process of S503 described above. The user can manipulate the manipulation unit 140A to select and hold the 3-dimensional model 902 in accordance with a message "Hold model with button X". The size of the 3-dimensional model 902 in the holding state is displayed as a size same as or closed to a size of an actual model in the real world considered to be the 3-dimensional model 902 by being scanned and received when viewed from the user or a size that at least does not cause any discomfort when held by a hand. The user can view the model stored in Storage by moving the held 3-dimensional model 902 to My Room and installing the model at a designated installation location. The size of the 3-dimensional model 902 in a selection candidate state before the holding may be different from a size of the 3-dimensional model 902 in the holding state. Specifically, the 3-dimensional model 902 in the selection candidate state may be displayed to be larger than the 3-dimensional model 902 in the holding state. In this case, it becomes easy to view the 3-dimensional model 902 in the selection candidate state in My Room.

Figure 10A:
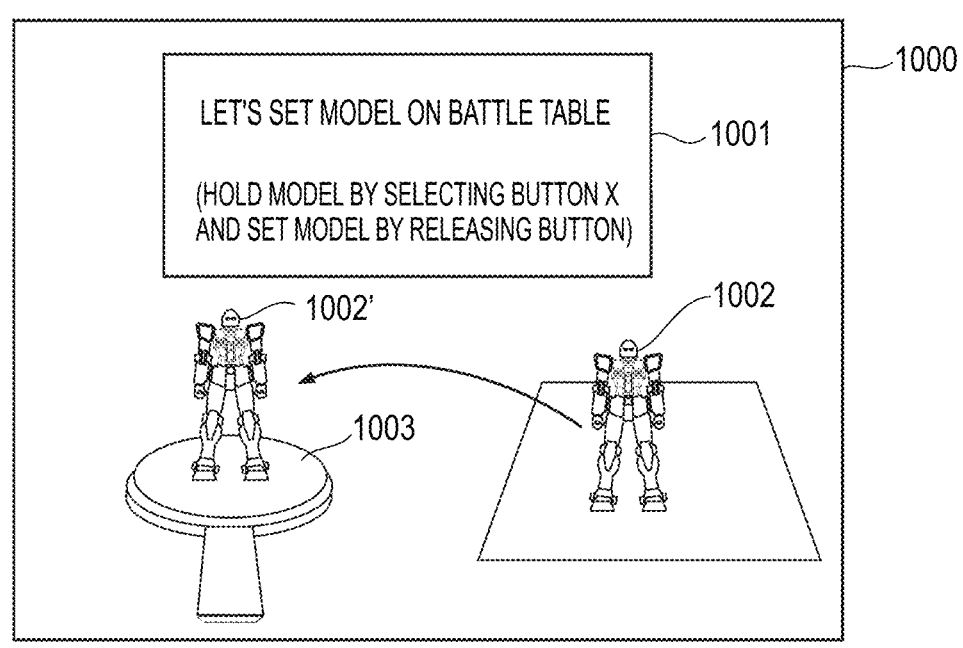
FIG. 10A is a diagram illustrating an example of a screen display in a battle room according to the embodiment.

For example, in an example of screen display in Battle Room illustrated in FIG. 10A, "Let's set model on battle table" is displayed in a region 1001 of a display screen 1000. A 3-dimensional model 1002 of a selection candidate is displayed in the lower portion of the display screen 1000. The 3-dimensional model 1002 corresponds to a model taken through the scanning process of S503 described above. That is, the user can conduct a battle game using the own model. The user can manipulate the manipulation unit 140A to select the 3-dimensional model 1002 in accordance with a message "Hold model by selecting Button X and set model by releasing Button X" so that the 3-dimensional model 1002 can be installed on a battle table 1003. A 3-dimensional model 1002' corresponds to the 3-dimensional model 1002 installed on the battle table 1003.

Referring back to FIG. 8, subsequently in S802, the CPU 101 determines whether the manipulation received in S801 is a manipulation for selecting a 3-dimensional model displayed on the screen. The manipulation can be determined based on whether a button manipulation corresponding to a selection button is received in a state in which a cursor displayed on the screen or the display of the controller corresponding to the controller 150B overlaps with the 3-dimensional model. When a plurality of 3-dimensional models are displayed on a screen, it is determined that the 3-dimensional model with which the cursor or the controller overlaps is selected. When the manipulation received in S801 is the manipulation for selecting the 3-dimensional model, the process proceeds to S806. When the manipulation is not the manipulation for selecting the 3-dimensional model, the process proceeds to S803.

In S806, the CPU 101 performs a displaying process corresponding to the manipulation received in S801. For example, when the manipulation for selecting the 3-dimensional model is received, a state in which the 3-dimensional model is held is displayed. Accordingly, the user can further move the 3-dimensional model selected through the manipulation input to any position. In the HMD 150A, the CPU 151 determines a gaze direction or an action based on detection information received from the detection unit 157 and adjusts a video presented on the display 156 of the HMD 150A so as to match the determined gaze direction or action. Thereafter, the process returns to S801 to repeat the above-described processes.

In S803, the CPU 101 determines whether the model selected through the received manipulation is installed at a predetermined location. When the received manipulation is not the installation of the selected model at the predetermined location, the process proceeds to S806, display corresponding to the received manipulation is performed, and the process returns to S801.

Figure 9B:
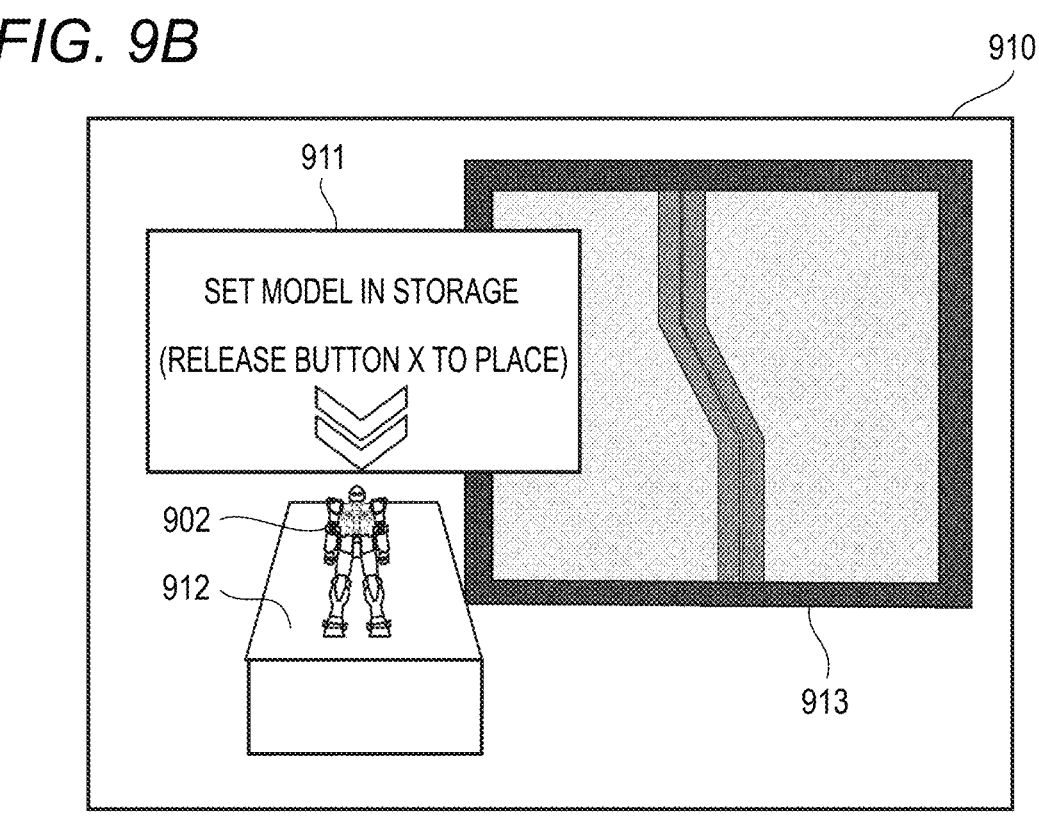
FIG. 9B is a diagram illustrating a screen display in my room according to the embodiment.

FIG. 9B illustrates an example of screen display when the 3-dimensional model is installed at a predetermined location in display of My Room. In FIG. 9B, "Set model in Storage" is displayed in a region 911 of the display screen 910 along with a message "Release button X to place". In accordance with this instruction, the user can install the selected 3-dimensional model 902 on an installation table 912, as illustrated in FIG. 9B. A door 913 leading to Storage is displayed on the back side of the region 911. Here, a case in which My Room is adjacent to Storage is illustrated, but My Room may be connected to Storage via a passage. In the example illustrated in FIG. 9B, the CPU 101 can determine whether the 3-dimensional model 902 is installed at a predetermined location according to whether a button manipulation is released in the state in which the 3-dimensional model 902 is in a region of the installation table 912.

Similarly, in an example illustrated in FIG. 10A, the CPU 101 can determines whether the 3-dimensional model 1002 is installed at a predetermined location according to whether a button manipulation is released in a state in which the 3-dimensional model 1002 in in a region of the battle table 1003.

Referring back to FIG. 8 in the description, when the manipulation received in S803 is the installation of the selected model at the predetermined location, the process proceeds to S804 and the CPU 101 performs effect display in accordance with the installation location. Thereafter, it is determined whether to end the process. When not ending this process, the process returns to S801 to repeat the above-described processes. When ending this process, the process ends.

Figure 9C:
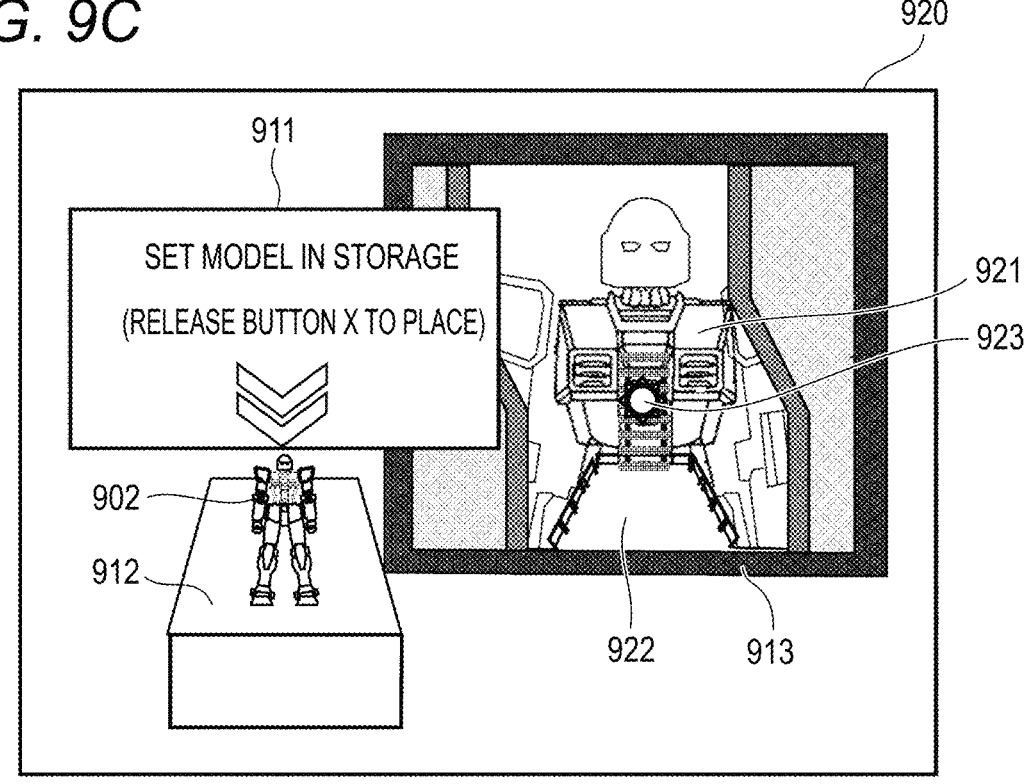
FIG. 9C is a diagram illustrating a screen display in my room according to the embodiment.

Specifically, in display of My Room, as illustrated in FIG. 9C, the door 913 of Storage is opened and an interior of Storage is displayed in response to installation of the 3-dimensional model 902 on the installation table 912. Inside Storage, a 3-dimensional model 921 obtained by extending the 3-dimensional model 902 installed on the installation table 912 is displayed. A passage 923 is displayed in front of the 3-dimensional model 921 and a sign 923 is displayed at the end of the passage 922.

The size of the 3-dimensional model 921 may be enlarged to a size occupying a predetermined region inside a space where the 3-dimensional model 921 is disposed in Storage. The size may be enlarged at a scale corresponding to the actual size of an original model of the 3-dimensional model 902. Alternatively, the size may be a scale corresponding to a scale (for example, 1/144, 1/100, 1/60, or the like) of the model.

Figure 9D:
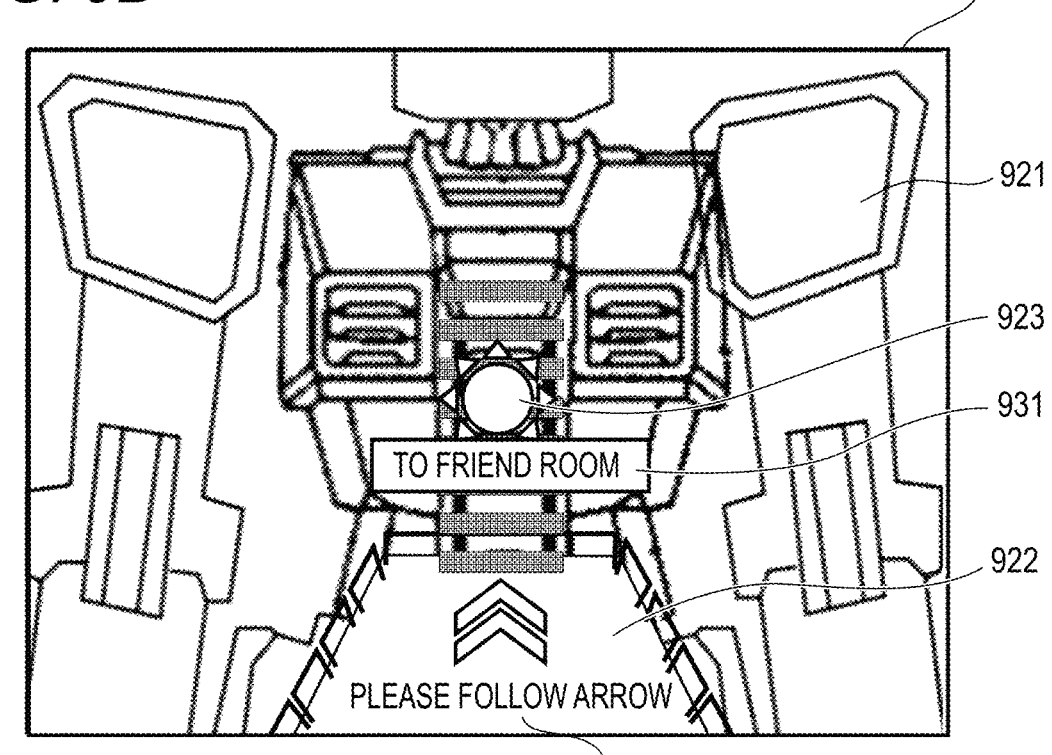
FIG. 9D is a diagram illustrating a screen display in my room according to the embodiment.

When a manipulation is further received in the display state of FIG. 9C and the received manipulation is a movement manipulation for changing a viewpoint position of the user and a manipulation for advancing in a direction of the passage 922, the display screen transitions to content illustrated in FIG. 9D. Here, the 3-dimensional model 921 is further enlarged and displayed inside a display screen 930 and the sign 923 is also enlarged and displayed in this way. In the sign 923, a message 931 "To Friend Room" overlaps and is displayed. In the passage 922, a message "Please follow arrow" is displayed. Accordingly, when the user performs an advancing manipulation for advancing in an arrow direction and moves to a position within a given distance up to the sign 923, the user can move to Friend Room. At this time, as an effect display, a video for getting on a cockpit of the 3-dimensional model 921 may be displayed on the display screen.

In the embodiment, when there are other users registered in the system, the user can select one user among the users. The user may register specific users among the other users in advance and may select one user among the plurality of registered specific users. Since Friend Room is allocated to each user, movement to Friend Room of each user is possible so that the Friend Room can be viewed in the above procedure.

Figure 10B:
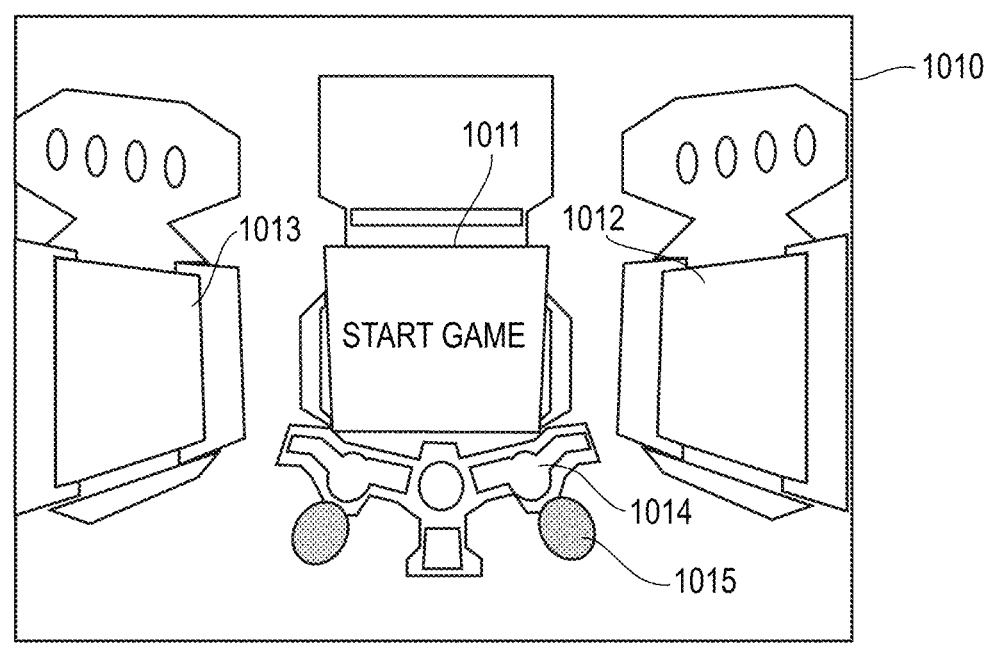
FIG. 10B is a diagram illustrating an example of a screen display in the battle room according to the embodiment.

In the display of Battle Room, display content of a display screen 1010 illustrated in FIG. 10B is switched in response to the installation of the 3-dimensional model 1002 on the battle table 1003. Display regions 1011, 1012, and 1013 are included in the display screen 1010 and videos of battle games that are being executed are displayed in the display regions 1011 to 1013. FIG. 10B illustrates a state in which the battle game is not started and reception of an instruction to start a game is waited for. A manipulation system 1014 is displayed in the lower portion of the display region 1011. An instruction reception unit 1015 is displayed in the operation system 1014.

Figure 10C:
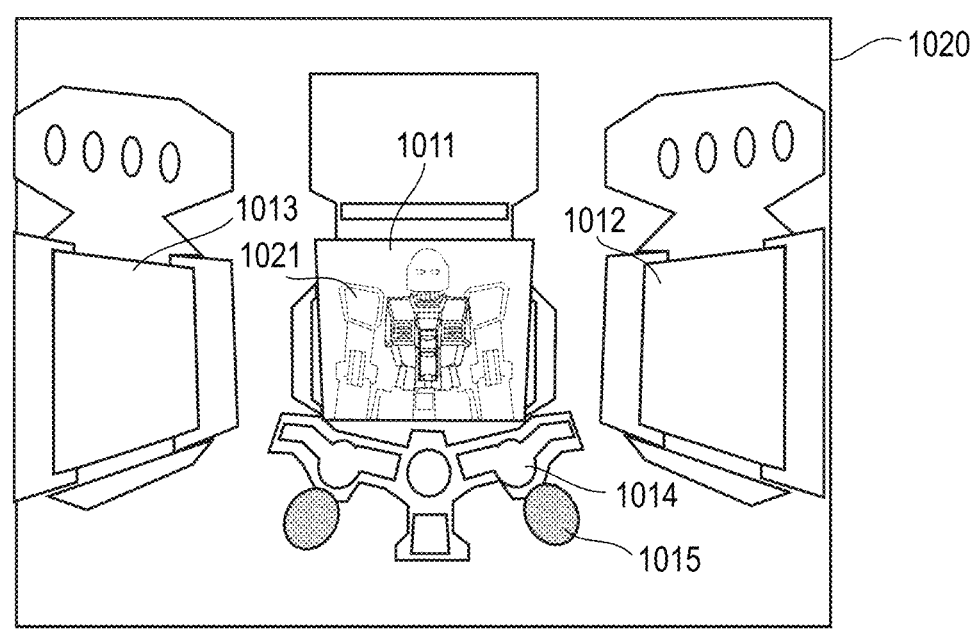
FIG. 10C is a diagram illustrating an example of a screen display in the battle room according to the embodiment.

By moving a cursor to the instruction reception unit 1015 and performing a click manipulation or overlapping the controller on the instruction reception unit 1015, It is determined that a game start is selected and the display screen is switched to the content illustrated in FIG. 10C. In the display screen 1020 of FIG. 10C, a video of a 3-dimensional model 1021 is displayed in the display region 1011 in the display state of FIG. 10B. The 3-dimensional model 1021 corresponds to the 3-dimensional model 1002 illustrated in FIG. 10A. Thereafter, display content of the display screen is switched to content illustrated in FIG. 10D.

Figure 10D:
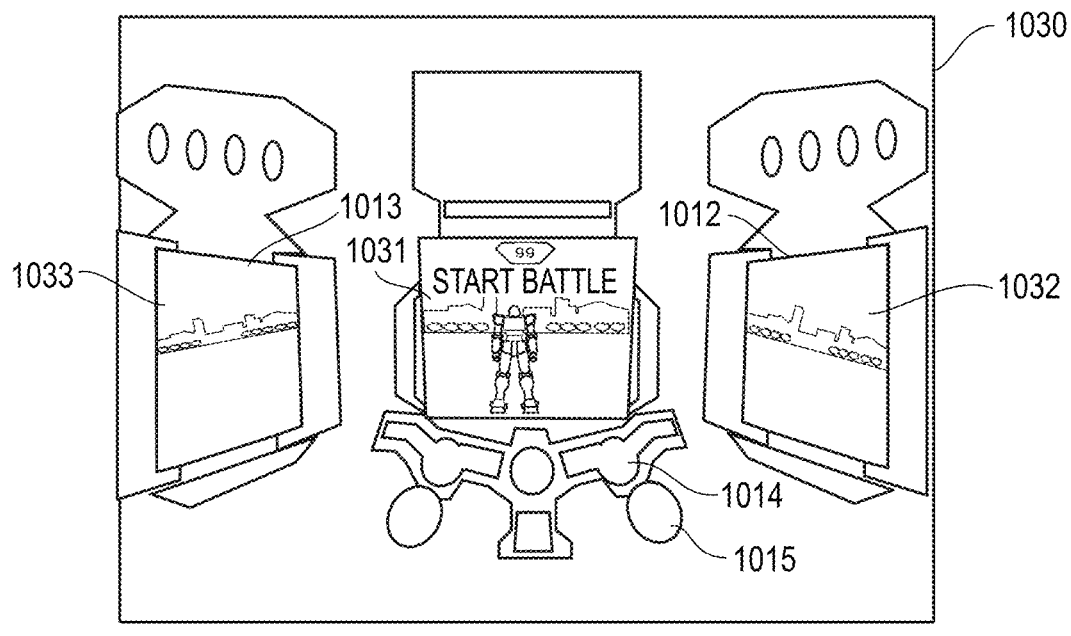
FIG. 10D is a diagram illustrating an example of a screen display in the battle room according to the embodiment.

FIG. 10D illustrates an example of a screen displayed when the battle game is started. Screens 1031, 1032, and 1033 of the battle game are displayed in the display regions 1011, 1012, and 1013, respectively. A 3-dimensional model and a remaining time of the game are displayed on the screen 1031. The user can manipulate the manipulation unit 104A or the controller to advance the game.

As described above, in the embodiment, the case in which the video displaying process based on the manipulation received from the user is performed in the information processing device 100 or the HMD 150A has been described. In the description of the above-described embodiment, the case in which the 3-dimensional model data generated from the image obtained by imaging the model is disposed in the virtual space and the display data for displaying the video is generated has been described. At this time, in the embodiment, a different effect video can be provided in accordance with a position at which the user installs the 3-dimensional model. In the above-described embodiment, the case in which the model of the user is stored in the storage at an actual scale and the model is used to perform the battle game as an effect video has been described, but an effect scheme is not limited thereto. For example, the model can also appear in an event, a concert, a sports game, an online conference, or the like carried out in a virtual space. Further, the technique of the embodiment can also be applied to a video technique capable of merging the real word and a virtual world, such as Cross Reality (XR) and allowing a person to perceive an object that is not present in the real space.

In this way, in the embodiment, the 3-dimensional model data can be generated from images obtained by imaging the outer appearance of a model and a video in which the 3-dimensional model is disposed in a virtual space can be viewed. Like an assembly plastic model, for example, a user can paint the model and finish the model as a unique item. Since the individual feature can be reflected in representation of a character in a moving image or a virtual space, preference can be significantly improved.

Conclusion of Embodiment

The above embodiment discloses the following video generation device and computer program.

(1) A video generation device including:

a generator configured to generate a video in which a 3-dimensional model is disposed in a virtual space, the 3-dimensional model being based on 3-dimensional model data generated from a scan image generated by scanning an image of an outer appearance of an object with a scanner;

an output unit configured to output the video generated by the generator to a display device;

a receiver configured to receive a manipulation input from a first observer of the video displayed on the display device; and a determination unit configured to determine content of the manipulation input received by the receiver, in which the generator is configured to generate the video in accordance with a result of a determination by the determination unit, and in which, when the determination unit determines that the 3-dimensional model is disposed at a predetermined position in the virtual space, the generator includes an effect different in accordance with a determined disposition location in the video.

(2) The video generation device according to (1), in which the predetermined position includes a first position in a first space of the virtual space, and in which the generator is configured to generate a video in which the 3-dimensional model is enlarged and displayed in a second space connected to the first space as the effect in response to disposition of the 3-dimensional model at the first position.

(3) The video generation device according to (2), in which the receiver is configured to receive a manipulation input for moving a viewpoint in the virtual space from the first observer, and in which, when the determination unit determines that the viewpoint is moved to vicinity of the enlarged and displayed 3-dimensional model based on the manipulation input from the first observer, the generator generates a video in which the viewpoint is moved from the second space to a third space different from the first and second spaces as the effect.

(4) The video generation device according to (3), in which the video in which the viewpoint is moved to the third space includes a video of an effect that the first observer boards the enlarged and displayed 3-dimensional model.

(5) The video generation device according to (2), in which the receiver is configured to receive a manipulation input for moving a viewpoint in the virtual space from the first observer, and in which, when the determination unit determines that the viewpoint is moved to vicinity of the enlarged and displayed 3-dimensional model based on the manipulation input from the first observer, the generator generates a video of an effect that the first observer boards the enlarged and displayed 3-dimensional model as the effect.

(6) The video generation device according to (3) or (4), in which the first space is associated with the first observer, and in which the third space is associated with a second observer different from the first observer.

(7) The video generation device according to (6), in which, when the determination unit determines that the viewpoint has arrived at the vicinity of the enlarged and displayed 3-dimensional model, the determination unit further determines the second observer based on a manipulation from the first observer for selecting one observer from a plurality of observers.

(8) The video generation device according to (6) or (7), in which the predetermined position includes a third position in a fourth space connected to the third space, and in which the generator generates a video of a game using the 3-dimensional model data in response to disposition of the 3-dimensional model at the third position.

(9) The video generation device according to (8), wherein the generator is configured to generate a video of a start screen of the game in response to the disposition of the 3-dimensional model at the third position.

(10) The video generation device according to (8) or (9), in which the game is a battle game.

(11) The video generation device according to (8) or (9), in which the game is a battle game with the second observer.

(12) The video generation device according to (1),
in which the predetermined position includes a third position in a fourth space of the virtual space, and
in which the generator is configured to generate a video of a game using the 3-dimensional model data in response to disposition at the third position.

(13) The video generation device according to any one of (1) to (12),
in which the video generation device is a head-mounted display,
in which the display device is a display included in the head-mounted display, and
in which the receiver is configured to receive the manipulation input via a controller associated with the head-mounted display.

(14) The video generation device according to (13),
in which the head-mounted display further includes a sensor configured to detect a visual line direction of the first observer, and
in which the generator is configured to adjust the video in accordance with the detected visual line direction.

(15) The video generation device according to (13) or (14),
in which the head-mounted display further includes a sensor configured to detect an inclination of the head-mounted display, and
in which the generator is configured to adjust the video in accordance with the detected inclination of the head-mounted display.

(16) The video generation device according to any one of (1) to (14),
in which the display device is an external display device connected to the video generation device, and
in which the receiver is configured to receive the manipulation input via a manipulation unit on the video generation device.

(17) A non-transitory computer-readable storage medium that stores computer-executable program comprising instructions which, when executed by a computer, cause a computer to function as:
a generator configured to generate a video in which a 3-dimensional model is disposed in a virtual space, the 3-dimensional model being based on 3-dimensional model data generated from a scan image generated by scanning an image of an outer appearance of an object with a scanner;
an output unit configured to output the video generated by the generator to a display device;
a receiver configured to receive a manipulation input from a first observer of a video displayed on the display device; and
a determination unit configured to determine content of the manipulation input received by the receiver, wherein the generator is configured to generate the video in accordance with a result of a determination by the determination part, and
wherein, when the determination unit determines that the 3-dimensional model is disposed at a predetermined position in the virtual space, the generator includes an effect different in accordance with a determined disposition location in the video.

The present invention is not limited to the above embodiments and can be modified and changed in various forms within the scope of the gist of the present invention.

What is claimed is:

1. A video generation device comprising:
a processor configured to generate a video in which a 3-dimensional model is disposed in a virtual space, the 3-dimensional model being based on 3-dimensional model data generated from a scan image generated by scanning an image of an outer appearance of an object with a scanner;
a display configured to display the video generated by the processor; and
a user interface configured to receive a manipulation input from a first observer of a video displayed on the display, wherein
the processor is further configured to
determine content of the manipulation input received by the user interface,
generate the video in accordance with a result of a determination, and
when determining that the 3-dimensional model is disposed at a predetermined position in the virtual space, include an effect different in accordance with a determined disposition location in the video,
wherein the predetermined position includes a first position in a first space of the virtual space, and
wherein the processor is configured to generate a video that includes the 3-dimensional model disposed at the first position in the first space and an enlarged 3-dimensional model disposed in a second space connected to the first space as the effect in response to disposition of the 3-dimensional model at the first position.

2. The video generation device according to claim 1,
wherein the user interface is configured to receive a manipulation input for moving a viewpoint in the virtual space from the first observer, and
wherein, when the processor determines that the viewpoint is moved to vicinity of the enlarged and displayed 3-dimensional model based on the manipulation input from the first observer, the processor generates a video in which the viewpoint is moved from the second space to a third space different from the first and second spaces as the effect.

3. The video generation device according to claim 2, wherein the video in which the viewpoint is moved to the third space includes a video of an effect that the first observer boards the enlarged and displayed 3-dimensional model.

4. The video generation device according to claim 1,
wherein the user interface is configured to receive a manipulation input for moving a viewpoint in the virtual space from the first observer, and
wherein, when the processor determines that the viewpoint is moved to vicinity of the enlarged and displayed 3-dimensional model based on the manipulation input from the first observer, the processor generates a video of an effect that the first observer boards the enlarged and displayed 3-dimensional model as the effect.

5. The video generation device according to claim 2, wherein the first space is associated with the first observer, and wherein the third space is associated with a second observer different from the first observer.

6. The video generation device according to claim 5, wherein, when the processor determines that the viewpoint has arrived at the vicinity of the enlarged and displayed 3-dimensional model, the processor further determines the second observer based on a manipulation from the first observer for selecting one observer from a plurality of observers.

7. The video generation device according to claim 5, wherein the predetermined position includes a third position in a fourth space connected to the third space, and wherein the processor generates a video of a game using the 3-dimensional model data in response to disposition of the 3-dimensional model at the third position.

8. The video generation device according to claim 7, wherein the processor is configured to generate a video of a start screen of the game in response to the disposition of the 3-dimensional model at the third position.

9. The video generation device according to claim 7, wherein the game is a battle game.

10. The video generation device according to claim 7, wherein the game is a battle game with the second observer.

11. The video generation device according to claim 1, wherein the predetermined position includes a third position in a fourth space of the virtual space, and wherein the processor is configured to generate a video of a game using the 3-dimensional model data in response to disposition at the third position.

12. The video generation device according to claim 1, wherein the video generation device is a head-mounted display, wherein the display is a display included in the head-mounted display, and wherein the user interface is configured to receive the manipulation input via a controller associated with the head-mounted display.

13. The video generation device according to claim 12, wherein the head-mounted display further includes a sensor configured to detect a visual line direction of the first observer, and wherein the processor is configured to adjust the video in accordance with the detected visual line direction.

14. The video generation device according to claim 12, wherein the head-mounted display further includes a sensor configured to detect an inclination of the head-mounted display, and wherein the processor is configured to adjust the video in accordance with the detected inclination of the head-mounted display.

15. The video generation device according to claim 1, wherein the display is an external display connected to the video generation device, and wherein the user interface is configured to receive the manipulation input via a manipulation unit on the video generation device.

16. A non-transitory computer-readable storage medium that stores computer-executable program comprising instructions which, when executed by a computer, cause a computer to:

generate a video in which a 3-dimensional model is disposed in a virtual space, the 3-dimensional model being based on 3-dimensional model data generated from a scan image generated by scanning an image of an outer appearance of an object with a scanner;

output the video to a display;

receive a manipulation input from a first observer of a video displayed on the display; and determine content of the manipulation input, wherein the computer generates the video in accordance with a result of a determination, wherein, when determining that the 3-dimensional model is disposed at a predetermined position in the virtual space, the computer includes an effect different in accordance with a determined disposition location in the video, wherein the predetermined position includes a first position in a first space of the virtual space, and wherein the computer generates a video that includes the 3-dimensional model disposed at the first position in the first space and an enlarged 3-dimensional model disposed in a second space connected to the first space as the effect in response to disposition of the 3-dimensional model at the first position.

* * * * *